(12) United States Patent
Sasaki et al.

(10) Patent No.: US 10,811,673 B2
(45) Date of Patent: *Oct. 20, 2020

(54) BATTERY

(71) Applicant: Panasonic Intellectual Property Management Co., Ltd., Osaka (JP)

(72) Inventors: Izuru Sasaki, Kyoto (JP); Ryuichi Natsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

This patent is subject to a terminal disclaimer.

(21) Appl. No.: 15/821,749

(22) Filed: Nov. 22, 2017

(65) Prior Publication Data

US 2018/0076452 A1 Mar. 15, 2018

Related U.S. Application Data

(63) Continuation of application No. PCT/JP2016/003948, filed on Aug. 30, 2016.

(30) Foreign Application Priority Data

Sep. 16, 2015 (JP) .................................. 2015-182640

(51) Int. Cl.
| | | |
|---|---|---|
| H01M 4/1315 | (2010.01) | |
| H01M 10/0562 | (2010.01) | |
| H01M 4/485 | (2010.01) | |
| H01M 10/052 | (2010.01) | |
| C01G 45/00 | (2006.01) | |
| C03C 10/00 | (2006.01) | |
| C03C 3/32 | (2006.01) | |
| H01M 4/505 | (2010.01) | |
| C01B 11/24 | (2006.01) | |
| H01M 10/0525 | (2010.01) | |
| H01M 4/02 | (2006.01) | |

(52) U.S. Cl.
CPC ............ *H01M 4/1315* (2013.01); *C01B 11/24* (2013.01); *C01G 45/006* (2013.01); *C03C 3/321* (2013.01); *C03C 10/00* (2013.01); *H01M 4/485* (2013.01); *H01M 4/505* (2013.01); *H01M 10/052* (2013.01); *H01M 10/0525* (2013.01); *H01M 10/0562* (2013.01); *C01P 2002/72* (2013.01); *C01P 2002/76* (2013.01); *C01P 2006/40* (2013.01); *H01M 2004/028* (2013.01); *H01M 2220/30* (2013.01); *H01M 2300/0068* (2013.01); *H01M 2300/0071* (2013.01)

(58) Field of Classification Search
CPC .... H01M 4/1315; H01M 4/505; H01M 4/485; H01M 10/0562; H01M 10/0525; H01M 10/052; H01M 2300/0071; H01M 2300/0068; H01M 2220/30; H01M 2004/028; C01G 45/006; C01P 2002/72; C01P 2002/76; C01P 2006/40

See application file for complete search history.

(56) References Cited

U.S. PATENT DOCUMENTS

| | | |
|---|---|---|
| 5,037,095 A | 8/1991 | Nedwick |
| 5,416,902 A | 5/1995 | Sato et al. |
| 5,872,491 A | 2/1999 | Kim et al. |
| 7,429,434 B2 | 9/2008 | Mihara et al. |
| 8,741,484 B2 | 6/2014 | Karthikeyan et al. |
| 9,178,249 B2 | 11/2015 | Amine et al. |
| 2002/0022183 A1 | 2/2002 | Ogawa et al. |
| 2002/0055042 A1 | 5/2002 | Kweon et al. |
| 2004/0202938 A1 | 10/2004 | Noguchi et al. |
| 2004/0229123 A1 | 11/2004 | Takahashi et al. |
| 2005/0084757 A1 | 4/2005 | Kweon et al. |
| 2009/0136854 A1 | 5/2009 | Nakura |
| 2009/0202892 A1 | 8/2009 | Inagaki et al. |
| 2010/0086854 A1 | 4/2010 | Kumar et al. |
| 2011/0247321 A1 | 10/2011 | Streeter et al. |
| 2011/0294019 A1 | 12/2011 | Amine et al. |
| 2013/0136987 A1 | 5/2013 | Uehara et al. |
| 2013/0209871 A1 | 8/2013 | Kato et al. |
| 2013/0266868 A1 | 10/2013 | Sun et al. |
| 2014/0099549 A1 | 4/2014 | Ceder et al. |

(Continued)

FOREIGN PATENT DOCUMENTS

| | | |
|---|---|---|
| CN | 103928672 A | 7/2014 |
| EP | 2921455 | 9/2015 |

(Continued)

OTHER PUBLICATIONS

International Search Report of PCT application No. PCT/JP2016/003948 dated Nov. 29, 2016.
International Search Report of PCT application No. PCT/JP2016/003955 dated Dec. 6, 2016.
ICSD Details on Search Result for Li2 (MN O3), printed on Feb. 4, 2020.
Coban, HUseyin Can Coban, "Metal Oxide (SnO2) Modified LiNi0.8Co0.202 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.

(Continued)

*Primary Examiner* — Laura Weiner
(74) *Attorney, Agent, or Firm* — McDermott Will & Emery LLP

(57) ABSTRACT

A battery includes a positive electrode containing a positive electrode active material, a negative electrode, and a solid electrolyte. The positive electrode active material contains a compound which has a crystal structure belonging to the space group FM3-M and which is represented by the following formula:

$$Li_x Me_y O_\alpha F_\beta \qquad (1)$$

where Me is one or more selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V and Cr and the conditions $1.7 \leq x \leq 2.2$, $0.8 \leq y \leq 1.3$, $1 \leq \alpha \leq 2.5$, and $0.5 \leq \beta \leq 2$ are satisfied.

6 Claims, 3 Drawing Sheets

(56) References Cited

U.S. PATENT DOCUMENTS

| | | | |
|---|---|---|---|
| 2014/0127583 A1 | 5/2014 | Han et al. | |
| 2014/0162127 A1 | 6/2014 | Kim et al. | |
| 2014/0205913 A1 | 7/2014 | Park et al. | |
| 2014/0272607 A1 | 9/2014 | Amine et al. | |
| 2015/0010819 A1 | 1/2015 | Lee et al. | |
| 2015/0090924 A1 | 4/2015 | Lee et al. | |
| 2015/0093646 A1 | 4/2015 | Kawada | |
| 2015/0214550 A1 | 7/2015 | Song et al. | |
| 2015/0228970 A1* | 8/2015 | Song | H01M 4/366 429/220 |
| 2015/0380768 A1 | 12/2015 | Mizuno et al. | |
| 2016/0013517 A1 | 1/2016 | Nakazawa et al. | |
| 2016/0049640 A1 | 2/2016 | Takeuchi et al. | |
| 2016/0372747 A1 | 12/2016 | Rolff et al. | |
| 2017/0005332 A1 | 1/2017 | Chen et al. | |
| 2017/0207444 A1 | 7/2017 | Yanagihara et al. | |
| 2019/0088940 A1 | 3/2019 | Ceder et al. | |

FOREIGN PATENT DOCUMENTS

| | | |
|---|---|---|
| JP | H01-209663 A | 8/1989 |
| JP | H07-037617 A | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 A | 4/2015 |
| JP | 2015-111551 A | 6/2015 |
| JP | 2015-118892 A | 6/2015 |
| JP | 2015-128023 | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 | 12/2012 |
| WO | 2014/126256 A1 | 8/2014 |
| WO | 2014/156153 A1 | 10/2014 |
| WO | 2014/157591 A1 | 10/2014 |

OTHER PUBLICATIONS

The Extended European Search Report dated Jun. 1, 2018 for the related European Patent Application No. 16827416.5.
Ayuko Kitajou et al: "Electrochemical Performance of a Novel Cathode material "LiFe0F" for Li-ion Batteries", Electrochemistry, vol. 83, No. 10, Jan. 1, 2015 (Jan. 1, 2015), pp. 885-888, XP055416459.
International Search Report of PCT application No. PCT/JP2016/003215 dated Sep. 20, 2016.
International Search Report of PCT application No. PCT/JP2017/027997 dated Sep. 26, 2017.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.
International Search Report of PCT application No. PCT/JP2016/003950 dated Nov. 29, 2016.
International Search Report of PCT application No. PCT/JP2017/026210 dated Oct. 17, 2017.
M. Holzapfel et al., "Lithium-Ion Conductors of the System LiCo1-xFexO2, Preparation and Structural Investigation," Journal of Solid State Chemistry, 2001, 156, pp. 470-479.
S. Muhammad et al., "Deciphering the thermal behavior of lithium rich cathode material by in situ X-ray diffraction echnique," Journal of Power Sources, 2015, 285, pp. 156-160.
International Search Report of PCT application No. PCT/JP2016/003956 dated Dec. 6, 2016..
Non-Final Office Action issued in U.S. Appl. No. 15/821,745, dated Dec. 10, 2019.
Notice of Allowance issued in U.S. Appl. No. 151821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Non-Final Office Action issued in U.S. Appl. No. 151702,632, dated Jun. 17, 2019.
Non-Final Office Action issued in U.S. Appl. No. 15/702,632, dated Nov. 26, 2019.
Final Office Action issued in U.S. Appl. No. 15/702,632, dated Aug. 23, 2019.

(56) References Cited

OTHER PUBLICATIONS

Non-Final Office Action issued in U.S. Appl. No. 15/838,360, dated Apr. 22, 2020.
Notice of Allowance issued in U.S. Appl. No. 151702,632, dated Apr. 20, 2020.
Notice of Allowance issued in U.S. Appl. No. 15/813,210, dated Apr. 22, 2020.
Notice of Allowance issued in U.S. Appl. No. 15/813,218, dated May 4, 2020.
Notice of Allowance issued in U.S. Appl. No. 15/813,212, dated May 1, 2020.
Notice of Allowance issued in U.S. Appl. No. 15/814,874, dated May 1, 2020.
Shuhua Ren et al, Improved Voltage and Cycling for intercalation in High-Capacity Disordered Oxyfluonde Cathodes, Advanced Science, Jun. 12, 2015, vol. 2 Issue 10, 1500128.
English Translation of Chinese Search Report dated Jul. 13, 2020 for the related Chinese Patent Application No. 201580013989.7.
Lianqi Zhang et al, "Synthesis and electrochemistry of cubic rocksait Li-Ni-Ti-O compounds in the phase diagram of $LiNiO_2$-$LiTiO_2$-$Li[Li1l3Ti2/3]O2$." Journal of Power Sources. 185(2008), P534-P541.
Written Opinion for Japanese Patent Application No. 2017-50475, dated Sep. 1, 2020; with English translation.

* cited by examiner

BATTERY

BACKGROUND

1. Technical Field

The present disclosure relates to a battery.

2. Description of the Related Art

International Publication No. 2012/176267 discloses a lithium secondary battery containing a sulfide solid electrolyte and the layered oxide $LiCoO_2$ as a positive electrode active material.

SUMMARY

In conventional techniques, a battery with high energy density is required to be achieved.

In one general aspect, the techniques disclosed here feature a battery including a positive electrode containing a positive electrode active material, a negative electrode, and a solid electrolyte. The positive electrode active material contains a compound which has a crystal structure belonging to the space group FM3-M and which is represented by the following formula:

$$Li_xMe_yO_\alpha F_\beta \quad (1)$$

In Formula (1), Me is one or more selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V and Cr and the conditions $1.7 \leq x \leq 2.2$, $0.8 \leq y \leq 1.3$, $1 \leq \alpha \leq 2.5$, and $0.5 \leq \beta \leq 2$ are satisfied.

According to the present disclosure, a battery with high energy density can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described below.

First Embodiment

Figure 1:
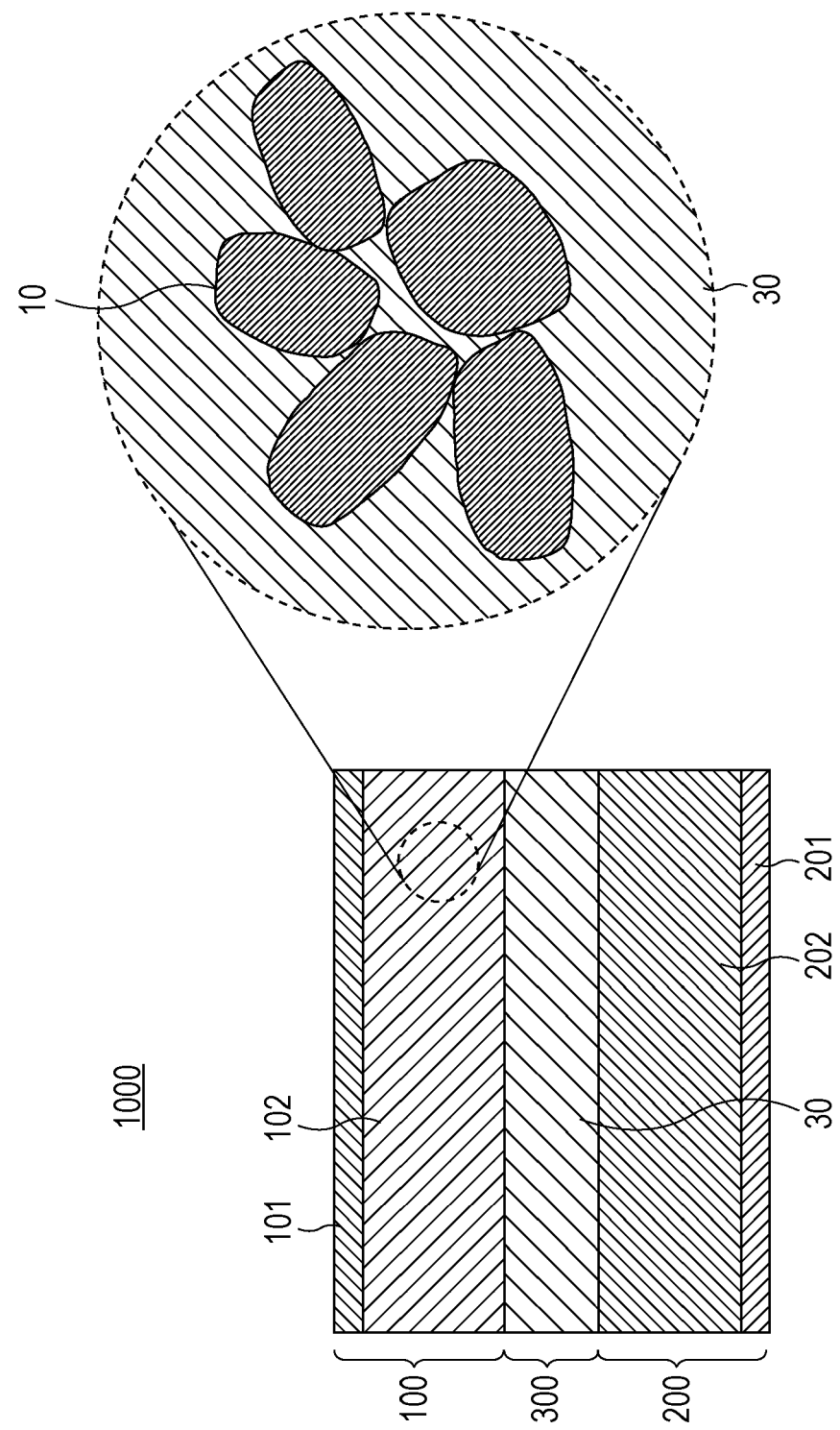
FIG. 1 is an illustration showing the schematic configuration of a battery according to a first embodiment of the present disclosure.

FIG. 1 is an illustration (sectional view) showing the schematic configuration of a battery 1000 according to a first embodiment of the present disclosure.

The battery 1000 includes a positive electrode 100, a negative electrode 200, and a solid electrolyte 30.

The positive electrode 100 contains a positive electrode active material 10.

The positive electrode active material 10 contains a compound which has a crystal structure belonging to the space group FM3-M and which is represented by the following formula:

$$Li_xMe_yO_\alpha F_\beta \quad (1)$$

In Formula (1), Me is at least one (that is, one or more selected from the group below) selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V and Cr and the conditions $1.7 \leq x \leq 2.2$, $0.8 \leq y \leq 1.3$, $1 \leq \alpha \leq 2.5$, and $0.5 \leq \beta \leq 2$ are satisfied.

According to the above configuration, an effect below can be achieved.

A conventional positive electrode active material (for example, $LiCoO_2$) with a layered structure contracts in volume by about 8% in association with the elimination of lithium. In, for example, a lithium secondary battery containing a lithium ion-conducting solid electrolyte, the contraction of the conventional positive electrode active material reduces the contact area between the conventional positive electrode active material and the lithium ion-conducting solid electrolyte. In portions out of contact, no lithium ions or electrons can be transferred; hence, a charge-discharge reaction does not proceed. In association with the volume contraction of the conventional positive electrode active material during charge, the contact area between the conventional positive electrode active material and the lithium ion-conducting solid electrolyte becomes smaller during discharge than during charge and therefore the discharge capacity becomes less than the charge capacity. In other words, the charge-discharge efficiency decreases. A decrease in charge-discharge efficiency reduces the energy density of a battery.

However, the change in volume of the positive electrode active material 10 in association with the elimination of lithium due to charge is small, about 2%. Therefore, the contact area between the positive electrode active material 10 and the solid electrolyte 30 does not vary significantly between charge and discharge and the charge-discharge efficiency is large. That is, a battery with high energy density can be achieved.

In the battery 1000, Me may be one selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V and Cr.

Alternatively, Me may be a solid solution of two or more selected from the group consisting of Mn, Co, Ni, Fe, Al, B, Ce, Si, Zr, Nb, Pr, Ti, W, Ge, Mo, Sn, Bi, Cu, Mg, Ca, Ba, Sr, Y, Zn, Ga, Er, La, Sm, Yb, V and Cr.

For example, a lithium ion battery manufactured using the positive electrode active material 10, which contains the compound represented by Formula (1), has an oxidation-reduction potential of about 3.3 V (Li/Li+ reference) and a capacity of about 220 mAh/g or more.

When x in Formula (1) is less than 1.7, the amount of available Li in the compound represented by Formula (1) is small. Therefore, the capacity is insufficient.

When x in Formula (1) is greater than 2.2 (in other words, when y is less than 0.8), the oxidation-reduction reaction of an available transition metal in the compound represented by Formula (1) is minor. As a result, the oxidation-reduction reaction of oxygen is major. This destabilizes the crystal structure. Therefore, the capacity is insufficient.

When α in Formula (1) is less than 1 (in other words, when β is greater than 2), the influence of F, which has high electronegativity, in the compound represented by Formula (1) is strong, resulting in a reduction in electronic conductivity. Therefore, the capacity is insufficient.

When α in Formula (1) is greater than 2.5 (in other words, when β is less than 0.5), the influence of F, which has high electronegativity, in the compound represented by Formula (1) is weak. As a result, the interaction between cations and anions decreases. This destabilizes the structure when Li is eliminated. Therefore, the capacity is insufficient.

In the battery 1000, the compound represented by Formula (1) has the crystal structure (rock-salt crystal structure) belonging to the space group FM3-M.

In Formula (1), the ratio of Li to Me is expressed by $\{Li_x/Me_y\}$.

In $\{Li/Me_y\}$, $1.7 \leq x \leq 2.2$ and $0.8 \leq y \leq 1.3$.

Thus, the ratio of Li to Me theoretically satisfies $1.31 \leq \{Li_x/Me_y\} \leq 2.75$ and is greater than 1.

That is, the number of Li atoms per Me atom in the compound represented by Formula (1) is greater than that in, for example, $LiMnO_2$, which is a conventional positive electrode active material.

In the compound represented by Formula (1), Li and Me are probably located at the same site.

Therefore, the compound represented by Formula (1) can intercalate and deintercalate a larger number of lithium ions per Me atom than, for example, $LiMnO_2$, which is a conventional positive electrode active material.

Thus, the positive electrode active material 10 is suitable to achieve a high-capacity lithium ion battery.

In a layered structure belonging to the space group R3-M, when a large number of Li ions are deintercalated, layers cannot be maintained and structural disruption occurs.

However, in a rock-salt crystal structure belonging to the space group FM3-M like the compound represented by Formula (1), even if a large number of Li ions are deintercalated, no structural disruption occurs and the structure can be maintained stable. This enables a high-capacity battery to be achieved.

The compound represented by Formula (1) may be $Li_2MnO_2F$, which has a crystal structure belonging to the space group FM3-M.

According to the above configuration, a battery with higher energy density can be achieved. Furthermore, a high-capacity battery can be achieved.

In the first embodiment, the positive electrode active material 10 may contain the compound represented by Formula (1) as a major component.

According to the above configuration, a higher-capacity battery can be achieved.

The term "major component" as used herein means that the positive electrode active material 10 contains 90% by weight or more of the compound represented by Formula (1).

The positive electrode active material 10, which contains the compound represented by Formula (1) as a major component, may further contain inevitable impurities or a starting material used to synthesize the compound represented by Formula (1), a by-product, and a decomposition product.

In the first embodiment, the compound represented by Formula (1) may be a compound satisfying $x+y=\alpha+\beta=3$ in Formula (1).

According to the above configuration, a higher-capacity battery can be achieved.

In the first embodiment, the battery 1000 may be configured in the form of, for example, a lithium ion secondary battery, a nonaqueous electrolyte secondary battery, or the like.

That is, in the battery 1000, the solid electrolyte 30 may be a lithium ion-conducting solid electrolyte.

In the battery 1000, the negative electrode 200 may contain metallic lithium or a negative electrode active material (having the property of storing and releasing lithium ions) capable of storing and releasing lithium ions.

As shown in FIG. 1, the battery 1000 includes a solid electrolyte layer 300 placed between the positive electrode 100 and the negative electrode 200.

The solid electrolyte layer 300 contains the solid electrolyte 30.

The solid electrolyte 30 used is an organic polymer solid electrolyte, an oxide solid electrolyte, a sulfide solid electrolyte, or the like.

The organic polymer solid electrolyte used may be, for example, a compound of a polymeric compound and a lithium salt.

The polymeric compound may have an ethylene oxide structure. When the polymeric compound may has the ethylene oxide structure, the polymeric compound can contain a large amount of the lithium salt and can increase the ionic conductivity.

The lithium salt used may be, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and/or the like. The lithium salt used may be one selected from these salts. Alternatively, the lithium salt used may be a mixture of two or more selected from these salts.

The oxide solid electrolyte used may be, for example, $LiTi_2(PO_4)_3$, a NASICON-type solid electrolyte typified by an element-substituted compound of $LiTi_2(PO_4)_3$, a (LaLi)$TiO_3$-based perovskite solid electrolyte, $Li_{14}ZnGe_4O_{16}$, $Li_4SiO_4$, $LiGeO_4$, a LISICON-type solid electrolyte typified by an element-substituted compound of $LiGeO_4$, $Li_7La_3Zr_2O_{12}$, a garnet solid electrolyte typified by an element-substituted compound of $Li_7La_3Zr_2O_{12}$, $Li_3N$, a H-substituted compound of $Li_3N$, $Li_3PO_4$, a N-substituted compound of $Li_3PO_4$, and/or the like.

The sulfide solid electrolyte used may be, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, $Li_{10}GeP_2S_{12}$, and/or the like. The following compounds may be added to these electrolytes: LiX (where X is F, Cl, Br, or I), $MO_y$, and $Li_xMO_y$ (where M is one of P, Si, Ge, B, Al, Ga, and In and x and y are natural numbers).

Among these electrolytes, the sulfide solid electrolyte has particularly high formability and ionic conductivity. Thus, using the sulfide solid electrolyte as the solid electrolyte 30 enables a battery with higher energy density to be achieved.

Among examples of the sulfide solid electrolyte, $Li_2S$—$P_2S_5$ has high electrochemical stability and higher ionic conductivity. Thus, using $Li_2S$—$P_2S_5$ as the solid electrolyte 30 enables a battery with higher energy density to be achieved.

The solid electrolyte layer 300 may contain a nonaqueous electrolyte solution.

The nonaqueous electrolyte solution contains a nonaqueous solvent and the lithium salt dissolved in the nonaqueous solvent.

The nonaqueous solvent used may be a cyclic carbonate solvent, a linear carbonate solvent, a cyclic ether solvent, a linear ether solvent, a cyclic ester solvent, a linear ester solvent, a fluorinated solvent, and/or the like.

Examples of the cyclic carbonate solvent include ethylene carbonate, propylene carbonate, and butylene carbonate.

Examples of the linear carbonate solvent include dimethyl carbonate, ethyl methyl carbonate, and diethyl carbonate.

Examples of the cyclic ether solvent include tetrahydrofuran, 1,4-dioxane, and 1,3-dioxolane.

Examples of the linear ether solvent includes 1,2-dimethoxyethane and 1,2-diethoxyethane.

An example of the cyclic ester solvent is γ-butyrolactone.

An example of the linear ester solvent is methyl acetate.

Examples of the fluorinated solvent include fluoroethylene carbonate, methyl fluoropropionate, fluorobenzene, fluoroethyl methyl carbonate, and fluorodimethylene carbonate.

The nonaqueous solvent used may be one selected from these solvents. Alternatively, the nonaqueous solvent used may be a mixture of two or more selected from these solvents.

The nonaqueous electrolyte solution may contain at least one selected from the group consisting of fluoroethylene carbonate, methyl fluoropropionate, fluorobenzene, fluoroethyl methyl carbonate, and fluorodimethylene carbonate.

The concentration of the lithium salt ranges from, for example, 0.5 mol/L to 2 mol/L.

When the solid electrolyte layer 300 contains the nonaqueous electrolyte solution, the transfer of lithium ions between an active material and the solid electrolyte 30 is easy. As a result, a battery with higher energy density can be achieved.

The solid electrolyte layer 300 may contain a gel electrolyte, an ionic liquid, and the like in addition to the solid electrolyte 30.

The gel electrolyte used may be one obtained by impregnating a polymeric material with the nonaqueous electrolyte solution. The polymeric material used may be polyethylene oxide, polyacrylonitrile, polyvinylidene fluoride, polymethyl methacrylate, a polymer having an ethylene oxide bond, and/or the like.

Cations contained in the ionic liquid may be quaternary linear aliphatic cations such as tetraalkyl ammonium cations and tetraalkyl phosphonium cations; alicyclic ammonium cations such as pyrrolidinium cations, morpholinium cations, imidazolinium cations, tetrahydropyridinium cations, piperazinium cations, and piperidinium cations; nitrogen-containing heteroaromatic cations such as pyridinium cations and imidazolinium cations; and/or the like. Anions contained in the ionic liquid may be $PF_6^-$ anions, $BF_4^-$ anions, $SbF_6^-$ anions, $AsF_6^-$ anions, $SO_3CF_3^-$ anions, $N(SO_2CF_3)_2^-$ anions, $N(SO_2C_2F_5)_2^-$ anions, $N(SO_2CF_3)(SO_2C_4F_9)^-$ anions, $C(SO_2CF_3)_3^-$ anions, and/or the like. The ionic liquid may contain the lithium salt.

As shown in FIG. 1, the positive electrode 100 includes a positive electrode current collector 101 and a positive electrode active material layer 102.

The positive electrode current collector 101 used may be a porous or poreless sheet or film made of a metal material such as aluminium, stainless steel, titanium, or an alloy thereof. Aluminium and an alloy thereof are inexpensive and are readily formed in to a thin film. The sheet or film used may be metal foil, mesh, or the like.

The positive electrode active material layer 102 is a layer containing the positive electrode active material 10.

The positive electrode active material 10, which is contained in the positive electrode active material layer 102, may be placed in contact with the solid electrolyte 30, which is contained in the solid electrolyte layer 300.

Alternatively, the positive electrode active material layer 102 may be a positive electrode mix layer containing the positive electrode active material 10 and the solid electrolyte 30.

As shown in FIG. 1, the negative electrode 200 includes a negative electrode current collector 201 and a negative electrode active material layer 202.

The negative electrode current collector 201 used may be a porous or poreless sheet or film made of a metal material such as stainless steel, nickel, copper, or an alloy thereof. Copper and an alloy thereof are inexpensive and are readily formed in to a thin film. The sheet or film used may be metal foil, mesh, or the like.

The negative electrode active material layer 202 is a layer containing a negative electrode active material 20.

The negative electrode active material 20, which is contained in the negative electrode active material layer 202, may be placed in contact with the solid electrolyte 30, which is contained in the solid electrolyte layer 300.

Alternatively, the negative electrode active material layer 202 may be a negative electrode mix layer containing the negative electrode active material 20 and the solid electrolyte 30.

The negative electrode active material 20 used may be a metal material, a carbon material, an oxide, a nitride, a tin compound, a silicon compound, or the like.

The metal material may be a single metal. Alternatively, the metal material may be an alloy. Examples of the metal material include metallic lithium and lithium alloys.

Examples of the carbon material include natural graphite, coke, graphitizing carbon, carbon fibers, spherical carbon, synthetic graphite, and amorphous carbon.

From the viewpoint of capacity density, silicon (Si), tin (Sn), the silicon compound, and the tin compound can be appropriately used. The silicon compound and the tin compound may be an alloy or a solid solution.

An example of the silicon compound is $SiO_x$ (where $0.05<x<1.95$). A compound (alloy or solid solution) obtained by partially substituting silicon in $SiO_x$ with another element can also be used. The other element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (where $0<x<2$), $SnO_2$, and $SnSiO_3$. One selected from these tin compounds may be used alone. Alternatively, a combination of two or more selected from these tin compounds may be used.

At least one of the positive electrode 100 and the negative electrode 200 may contain a conductive aid as required.

The conductive aid is used to reduce the electrode resistance. Examples of the conductive aid include graphites such as natural graphite and synthetic graphite; carbon blacks such as acetylene black and Ketjenblack; conductive fibers such as carbon fibers and metal fibers; carbon fluoride; powders of metals such as aluminium; conductive whiskers such as zinc oxide whiskers and potassium titanate whiskers; conductive metal oxides such as titanium oxide; and conductive polymers such as polyaniline, polypyrrole, and polythiophene. Using a carbon conductive aid as the conductive aid enables cost reduction.

At least one of the positive electrode 100 and the negative electrode 200 may contain a binding agent as required.

The binding agent is used to increase the bindability of a material making up an electrode. Examples of the binding agent include polyvinylidene fluoride, polytetrafluoroethylene, polyethylene, polypropylene, aramid resins, polyamide, polyimide, polyamideimide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, polyhexafluoropropylene, styrene-butadiene rubber, and carboxymethylcellulose. The binding agent used may be a copolymer of two or more selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. Alternatively, the binding agent used may be a mixture of two or more selected from these monomers.

In the first embodiment, the battery 1000 may be a coin-type battery, a cylindrical battery, a prismatic battery, a sheet battery, a button-type battery, a flat battery, a stacked battery, or the like.

Method for Producing Compound

An example of a method for producing the compound represented by Formula (1) is described below.

The compound represented by Formula (1) can be produced by, for example, a method below.

A raw material containing Li, a raw material containing F, and a raw material containing Me are prepared. Examples of the raw material containing Li include oxides such as $Li_2O$ and $Li_2O_2$; salts such as LiF, $Li_2CO_3$, and LiOH; and lithium-transition metal composite oxides such as $LiMeO_2$ and $LiMe_2O_2$. Examples of the raw material containing F include LiF and transition metal fluorides. Examples of the raw material containing Me include oxides, such as $Me_2O_3$, in various oxidation states; salts such as $MeCO_3$ and $MeNO_3$; hydroxides such as $Me(OH)_2$ and MeOOH; and lithium-transition metal composite oxides such as $LiMeO_2$ and $LiMe_2O_2$. When Me is, for example, Mn, examples of a raw material containing Mn include manganese oxides, such as $Mn_2O_3$, in various oxidation states; salts such as $MnCO_3$ and $MnNO_3$; hydroxides such as $Mn(OH)_2$ and MnOOH; and lithium-transition metal composite oxides such as $LiMnO_2$ and $LiMn_2O_2$.

The raw materials are weighed such that the molar ratio shown in Formula (1) is obtained.

This allows "x, y, $\alpha$, and $\beta$" in Formula (1) to vary within the ranges shown in Formula (1).

The compound represented by Formula (1) can be obtained in such a manner that the weighed raw materials are mixed together by, for example, a dry process or a wet process and are allowed to react mechanochemically for 10 hours or more. For example, a mixer such as ball mill can be used.

The compound represented by Formula (1) can be substantially obtained by adjusting the raw materials used and conditions for mixing the raw materials.

Using a lithium-transition metal composite oxide as a precursor enables the mixing energy of various elements to be reduced. This allows the obtained compound represented by Formula (1) to have higher purity.

The composition of the obtained compound represented by Formula (1) can be determined by, for example, ICP emission spectrometry and an inert gas fusion-infrared absorption method.

The compound represented by Formula (1) can be identified in such a manner that the space group of the crystal structure thereof by powder X-ray analysis.

As described above, the method for producing the compound represented by Formula (1) includes Step (a) of preparing the raw materials and Step (b) of allowing the raw materials to react mechanochemically to obtain the compound represented by Formula (1).

Step (a) may include a sub-step of preparing a raw material mixture in such a manner that the raw material containing Li, the raw material containing F, and the raw material containing Me are mixed such that the molar ratio of Li to Me ranges from 1.31 to 2.33.

In this case, Step (a) may include a sub-step of preparing a lithium-transition metal composite oxide serving as a raw material by a known process.

Step (a) may include a sub-step of preparing a raw material mixture in such a manner that the raw material containing Li, the raw material containing F, and the raw material containing Me are mixed such that the molar ratio of Li to Me ranges from 1.7 to 2.0.

Step (b) may include a sub-step of allowing the raw materials to react mechanochemically using a ball mill.

As described above, the compound represented by Formula (1) can be synthesized in such a manner that precursors (for example, LiF, $Li_2O$, a transition metal oxide, a lithium-transition metal composite oxide, and the like) are allowed to react mechanochemically using a planetary ball mill.

In this operation, a larger number of Li atoms can be contained by adjusting the mixing ratio of the precursors.

However, in the case where the precursors are allowed to react by a solid-phase process, the precursors are decomposed into more stable compounds.

That is, the compound, having the crystal structure belonging to the space group FM3-M, represented by Formula (1) cannot be obtained by a preparation method in which the precursors are allowed to react by the solid-phase process.

Second Embodiment

A second embodiment of the present disclosure is described below with reference to a drawing. Descriptions common to the first embodiment will be appropriately omitted.

Figure 2:
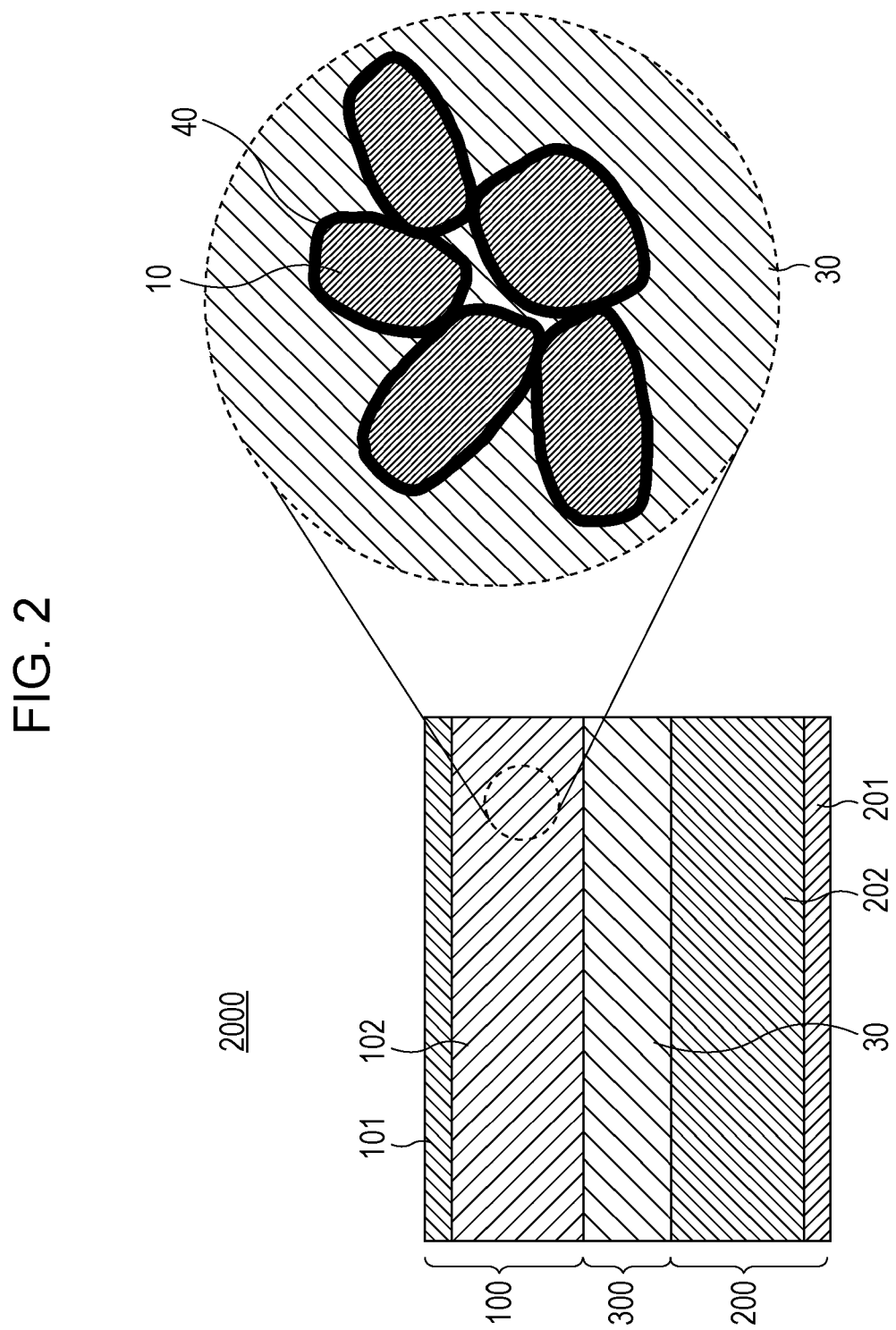
FIG. 2 is an illustration showing the schematic configuration of a battery according to a second embodiment of the present disclosure.

FIG. 2 is an illustration (sectional view) showing the schematic configuration of a battery 2000 according to the second embodiment.

The battery 2000 has a configuration below in addition to the configuration of the battery 1000.

That is, in the battery 2000, particles of the positive electrode active material 10 are coated with an oxide solid electrolyte 40.

That is, in the battery 2000, at least one portion of the surface of each of the positive electrode active material 10 particles is coated with the oxide solid electrolyte 40.

According to the above configuration, an effect below can be achieved.

In an interface at which a positive electrode active material and a nonaqueous electrolyte are in contact with each other, a high-resistance layer called a space charge layer is formed. The formation of the high-resistance layer increases the internal resistance of a battery, resulting in a reduction in energy density.

In the battery 2000, the positive electrode active material 10 particles are coated with the oxide solid electrolyte 40. That is, the oxide solid electrolyte 40 is placed between the positive electrode active material 10 particles and the solid electrolyte 30, whereby the direct contact therebetween is avoided. This suppresses the formation of a space charge layer. Therefore, the increase in internal resistance of the battery 2000 is suppressed. As a result, a battery with high energy density can be achieved.

The oxide solid electrolyte 40 may be a material conducting lithium ions. Examples of the oxide solid electrolyte 40 include $LiTi_2(PO_4)_3$, NASICON-type solid electrolytes typified by an element-substituted compound of $LiTi_2(PO_4)_3$, $(LaLi)TiO_3$-based perovskite solid electrolytes, $Li_{14}ZnGe_4O_{16}$, $Li_4SiO_4$, $LiGeO_4$, LISICON-type solid electrolytes typified by an element-substituted compound of $LiGeO_4$, $Li_7La_3Zr_2O_{12}$, garnet solid electrolytes typified by an element-substituted compound of $Li_7La_3Zr_2O_{12}$, $Li_3N$, H-substituted compounds of $Li_3N$, $Li_3PO_4$, N-substituted compounds of $Li_3PO_4$, $LiNbO_3$, $Li_2O$—$B_2O_3$, $Li_2CO_3$, $Li_2O$—$Al_2O_3$, $Li_2O$—$SiO_2$, $Li_2SO_4$, $Li_2O$—$TiO_2$, $Li_2O$—$Zr_2O_3$, $Li_2O$—$MoO_3$, $Li_2O$—$V_2O_5$, and $Li_2O$—$WO_3$.

Among these electrolytes, $LiNbO_3$ has particularly high ionic conductivity and electrochemical stability. Thus, $LiNbO_3$ can suppress the formation of the space charge layer well. Therefore, using $LiNbO_3$ as the oxide solid electrolyte 40 enables a battery with higher energy density to be achieved.

In the battery 2000, the whole surface of each positive electrode active material 10 particle may be coated with the oxide solid electrolyte 40.

According to the above configuration, the formation of the space charge layer is further suppressed. Therefore, the internal resistance of a battery is further suppressed. As a result, a battery with higher energy density can be achieved.

EXAMPLES

Example 1

Preparation of Positive Electrode Active Material

LiF and $LiMnO_2$ were weighed such that the molar ratio of LiF to $LiMnO_2$ was 1.0:1.0.

Obtained raw materials were put into a 45 cc zirconia vessel together with an appropriate amount of zirconia balls with a diameter of 3 mm. The zirconia vessel was hermetically sealed in an argon glove box.

The zirconia vessel was taken out of the argon glove box, followed by treatment at 600 rpm for 30 hours using a planetary ball mill.

An obtained compound was measured by powder X-ray diffraction.

Figure 3:
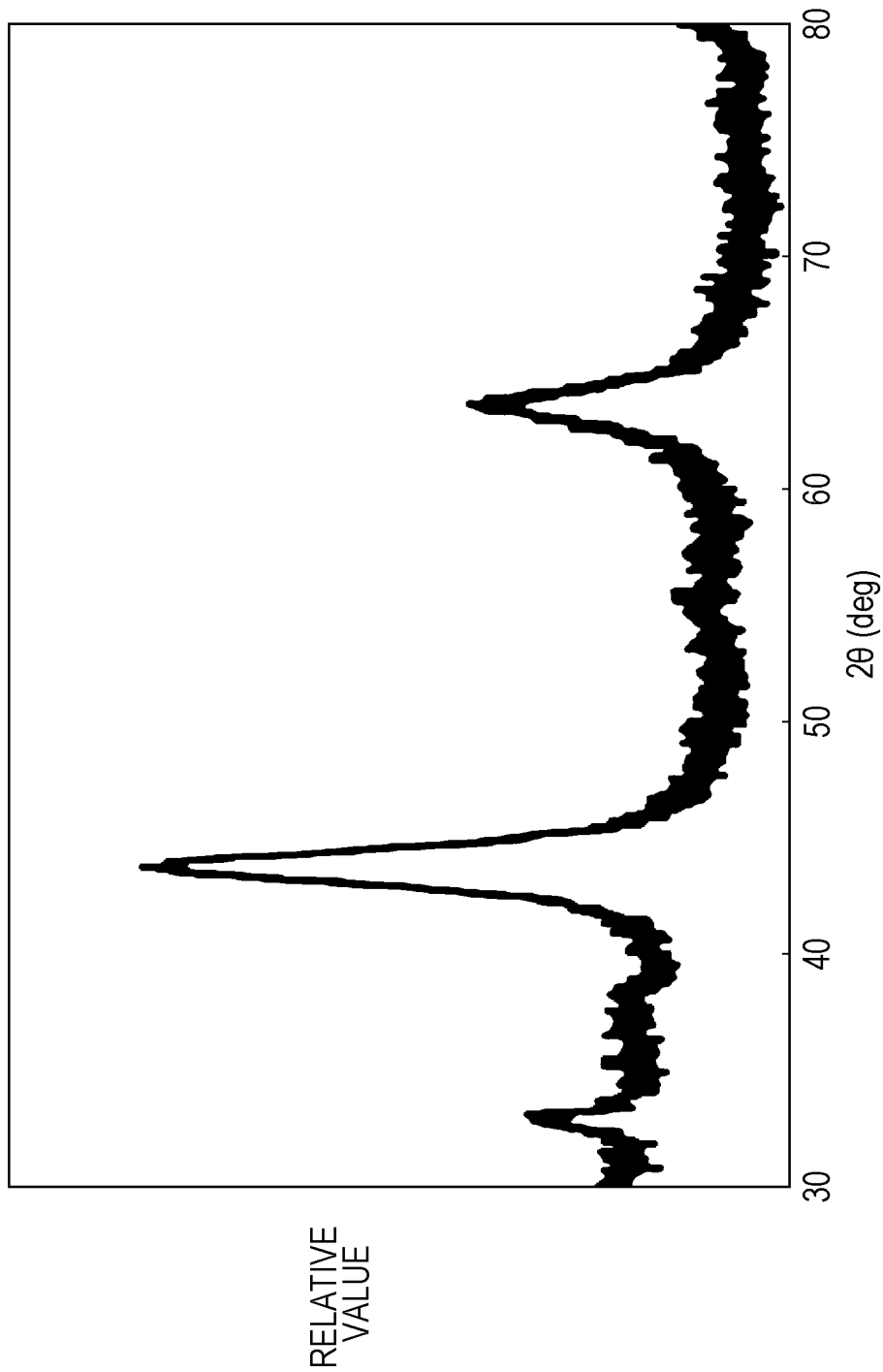
FIG. 3 is a graph showing a powder X-ray diffraction chart of a positive electrode active material prepared in Example 1.

Measurement results are shown in FIG. 3.

The space group of the obtained compound was FM3-M.

The composition of the obtained compound was determined by ICP emission spectrometry and an inert gas fusion-infrared absorption method.

As a result, the composition of the obtained compound was $Li_2MnO_2F$. Coating of positive electrode active material particles with oxide solid electrolyte In an argon glove box, 0.06 mg of metallic Li (produced by The Honjo Chemical Corporation) and 2.87 mg of pentaethoxy niobium (Kojundo Chemical Laboratory Co., Ltd.) were dissolved in 0.2 mL of super-dehydrated ethanol (produced by Wako Pure Chemical Industries, Ltd.), whereby a coating solution was prepared.

On an agate mortar, the prepared coating solution was slowly added to 100 mg of $Li_2MnO_2F$ which was a positive electrode active material, followed by stirring.

After all the coating solution was added, stirring was performed on a 30° C. hotplate until drying could be visually confirmed.

Dried powder was put into an aluminium crucible, which was taken under an air atmosphere.

Next, the powder was heat-treated at 300° C. for 1 hour under the air atmosphere.

The heat-treated powder was ground in the agate mortar, whereby particles of the positive electrode active material that were coated with an oxide solid electrolyte were obtained.

The oxide solid electrolyte, which was used to coat the positive electrode active material particles, was $LiNbO_3$.
Preparation of Solid Electrolyte In an argon glove box, $Li_2S$ and $P_2S_5$ were weighed such that the molar ratio of $Li_2S$ to $P_2S_5$ was 80:20.

These were ground and mixed in a mortar.

Thereafter, the mixture was milled for 10 hours in a planetary ball mill, whereby a glassy solid electrolyte was obtained.

The glassy solid electrolyte was measured for crystallization temperature using a differential scanning calorimeter.

The glassy solid electrolyte was heat-treated at a temperature 20° C. higher than the crystallization temperature thereof for 2 hours in an inert atmosphere.

This allowed $Li_2S$—$P_2S_5$, which was a glass-ceramic solid electrolyte, to be obtained.

By an alternating-current impedance method, the ionic conductivity of the synthesized solid electrolyte was confirmed to be $7.2 \times 10^{-4}$ S/cm.
Preparation of Positive Electrode Mix In an argon glove box, $Li_2S$—$P_2S_5$, which was the glass-ceramic solid electrolyte, and the positive electrode active material particles coated with the oxide solid electrolyte were weighed such that the weight ratio of $Li_2S$—$P_2S_5$ to the positive electrode active material particles coated with the oxide solid electrolyte was 80:20.

These were mixed in an agate mortar, whereby a positive electrode mix was prepared.
Preparation of Secondary Battery In an insulating enclosure, 80 mg of $Li_2S$—$P_2S_5$, which was the glass-ceramic solid electrolyte, 10 mg of the positive electrode mix, and a stainless steel current collector were stacked in that order.

The stack was pressed with a pressure of 360 MPa, whereby a positive electrode and a solid electrolyte layer were obtained.

Next, metallic In (a thickness of 200 μm) and a stainless steel current collector were stacked on the side of the solid electrolyte layer that is opposite to the positive electrode in that order.

This stack was pressed with a pressure of 80 MPa, whereby a negative electrode was prepared.

Next, a current collector lead was attached to each current collector.

Finally, the inside of the insulating enclosure was isolated and sealed from an air atmosphere using an insulating ferrule, whereby a secondary battery was prepared.
Charge-Discharge Test A charge-discharge test was performed under conditions below using the prepared secondary battery.

The secondary battery was placed in a 85° C. thermostatic chamber.

Constant-current charge was performed at a current of 52.5 μA corresponding to 0.05 C rate (20-hour rate) with respect to the theoretical capacity of the battery, followed by finishing charge at a voltage of 4.6 V.

Next, likewise, discharge was performed at a current of 52.5 μA corresponding to 0.05 C rate, followed by finishing discharge at the voltage of 0.9 V.

The charge-discharge efficiency was calculated in accordance with an equation below.

Charge-discharge efficiency (%)=initial discharge capacity (mAh/g)/initial charge capacity (mAh/g)×100

The discharge capacity rate was determined by a charge-discharge test in such a manner that the secondary battery was placed in a 25° C. thermostatic chamber.

Results of the above are shown in Table below.

Example 2

A secondary battery was prepared in substantially the same manner as that used in Example 1 except that the positive electrode active material particles were not coated with the oxide solid electrolyte.

A charge-discharge test was performed in such a manner that the secondary battery was placed in a 25° C. thermostatic chamber, whereby the discharge capacity rate was determined.

Results of the above are shown in Table below.

Comparative Example 1

A secondary battery was prepared in substantially the same manner as that used in Example 1 except that particles of a positive electrode active material were coated with an oxide solid electrolyte below. A charge-discharge test was performed as described below.

Containing of Positive Electrode Active Material Particles with Oxide Solid Electrolyte In an argon glove box, 0.13 mg of metallic Li (produced by The Honjo Chemical Corporation) and 7.73 mg of pentaethoxy niobium (Kojundo Chemical Laboratory Co., Ltd.) were dissolved in 0.1 mL of super-dehydrated ethanol (produced by Wako Pure Chemical Industries, Ltd.), whereby a coating solution was prepared.

On an agate mortar, the prepared coating solution was slowly added to 200 mg of the layered oxide $LiNi_{0.8}Co_{0.15}Al_{0.05}O_2$ which was the positive electrode active material, followed by stirring.

After all the coating solution was added, stirring was performed on a 30° C. hotplate until drying could be visually confirmed.

Dried powder was put into an aluminium crucible, which was taken under an air atmosphere.

Next, the powder was heat-treated at 300° C. for 1 hour under the air atmosphere.

The heat-treated powder was ground in the agate mortar, whereby the positive electrode active material particles coated with the oxide solid electrolyte were obtained.

The oxide solid electrolyte, which was used to coat the positive electrode active material particles, was $LiNbO_3$.

Charge-Discharge Test

A charge-discharge test was performed under conditions below using the prepared secondary battery.

The secondary battery was placed in a 85° C. thermostatic chamber.

Constant-current charge was performed at a current of 70.0 μA corresponding to 0.05 C rate (20-hour rate) with respect to the theoretical capacity of the battery and charge was finished at the voltage of 3.7 V.

Next, likewise, discharge was performed at a current of 70.0 μA corresponding to 0.05 C rate and discharge was finished at the voltage of 1.9 V.

The charge-discharge efficiency was calculated in accordance with an equation below.

Charge-discharge efficiency (%)=initial discharge capacity (mAh/g)/initial charge capacity (mAh/g)×100

The above results are shown in Table below.

The discharge capacity rate is a value determined on the basis of the discharge capacity obtained in Example 2.

TABLE

|  | Composition of positive electrode active material | Solid electrolyte | Positive electrode active material particles | Charge-discharge efficiency (%) | Discharge capacity rate |
| --- | --- | --- | --- | --- | --- |
| Example 1 | $Li_2MnO_2F$ | $Li_2S-P_2S_5$ | Coated ($LiNbO_3$) | 84.9 | 2.7 |
| Example 2 | $Li_2MnO_2F$ | $Li_2S-P_2S_5$ | Not coated | — | 1 |
| Comparative Example 1 | $LiNi_{0.8}Co_{0.15}Al_{0.05}O_2$ | $Li_2S-P_2S_5$ | Coated ($LiNbO_3$) | 71.8 | — |

From the above results, effects below have been confirmed.

It has become clear that, in a secondary battery containing a solid electrolyte, using $Li_2MnO_2F$ as a positive electrode active material enables higher charge-discharge efficiency to be obtained as compared to using $LiNi_{0.8}Co_{0.15}Al_{0.05}O_2$ as a positive electrode active material.

Furthermore, it has become clear that coating particles of a positive electrode active material with an oxide solid electrolyte enables high charge-discharge efficiency to be obtained.

A battery according to present disclosure can be used as, for example, an all-solid-state lithium secondary battery or the like.

What is claimed is:

1. A battery comprising:
   a positive electrode containing a positive electrode active material;
   a negative electrode; and
   a solid electrolyte,
   wherein the positive electrode active material contains $Li_2MnO_2F$ having a crystal structure belonging to the space group FM-3M.

2. The battery according to claim 1, wherein the negative electrode contains a negative electrode active material having the property of storing and releasing lithium ions or metallic lithium and the solid electrolyte is a lithium ion-conducting solid electrolyte.

3. The battery according to claim 1, wherein the solid electrolyte is a sulfide solid electrolyte.

4. The battery according to claim 3, wherein the solid electrolyte is $Li_2S$—$P_2S_5$.

5. The battery according to claim 1, wherein particles of the positive electrode active material are coated with an oxide solid electrolyte.

6. The battery according to claim 5, wherein the oxide solid electrolyte is $LiNbO_3$.

* * * * *